United States Patent [19] MacAfee

[11] 4,046,349
[45] Sept. 6, 1977

[54] SUPPORT ASSEMBLY FOR FORWARDLY SHIFTABLE VEHICLE SEAT
[75] Inventor: James E. MacAfee, Grosse Isle, Mich.
[73] Assignee: American Motors Corporation, Southfield, Mich.
[21] Appl. No.: 693,613
[22] Filed: June 7, 1976
[51] Int. Cl.² .......................................... B60M 1/08
[52] U.S. Cl. ................................ 248/424; 297/340; 297/344
[58] Field of Search ............... 248/393, 424; 297/325, 297/329, 344, 345, 393, 340

[56] References Cited
U.S. PATENT DOCUMENTS

| 2,239,917 | 4/1941 | Hunter et al. | 248/395 X |
|---|---|---|---|
| 2,820,506 | 1/1958 | Duluk et al. | 297/341 |
| 2,826,241 | 3/1958 | Himka | 297/341 |
| 2,856,983 | 10/1958 | Probst et al. | 297/341 |
| 2,942,646 | 6/1960 | Himka et al. | 297/341 |
| 2,980,163 | 4/1961 | Pickles | 248/395 |
| 3,008,681 | 11/1961 | Matthews | 248/424 X |
| 3,136,524 | 6/1964 | Pickles | 248/424 |
| 3,583,665 | 6/1971 | Lohr | 248/395 |
| 3,727,976 | 4/1973 | Lystad | 297/340 |

FOREIGN PATENT DOCUMENTS

| 1,102,223 | 10/1955 | France | 297/345 |
|---|---|---|---|
| 887,960 | 1/1962 | United Kingdom | 297/344 |

Primary Examiner—J. Franklin Foss
Attorney, Agent, or Firm—Reising, Ethington, Barnard

[57] ABSTRACT

A seat support assembly of the disclosure mounts a vehicle seat on an associated vehicle floor for movement between a forward easy-enter position and a rearward seating position and has a curved link construction that increases the access space to the rear of the seat in the forward easy-enter position as well as including a latch mechanism for normally maintaining the seat in the seating position but releasable by a first outboard handle and a second rear handle having a bight portion that allows forward seat movement.

19 Claims, 6 Drawing Figures

SUPPORT ASSEMBLY FOR FORWARDLY SHIFTABLE VEHICLE SEAT

BACKGROUND OF THE INVENTION

1. Field of the Invention

This invention relates to a vehicle seat support assembly that mounts a vehicle seat for movement between a forward easy-enter position where access to the rear of the seat from an adjacent side door is possible and also relates to a latch mechanism that maintains the support assembly in a rearward seating position while selectively permitting forward movement to the easy-enter position.

2. Description of the Prior Art

Vehicle seats have previously been mounted on a vehicle floor for movement between a rearward seating position and a forward easy-enter position. In the rearward seating position, seat occupant is afforded sufficient leg room forward of the seat so that a comfortable seating position can be assumed. Upon seat movement to the forward easy-enter position, a passenger is afforded sufficient access space to leave or enter the area rearward of the seat through a side door opening laterally adjacent the seat. Usually, this type of seat support assembly is utilized with a "two-door" vehicle to support a front seat whose consequent movement facilitates passenger movement to and from a rear sheet behind the front seat. However, it is also possible to utilize this type of support assembly with other types of vehicle seats such as the second seat of a "four-door" station wagon having a seating or cargo area rearward of the second seat. Regardless of which seat the support assembly is utilized with, it is necessary to incorporate a latch mechanism for normally maintaining the seat in its rearward seating position and for selectively permitting forward seat movement to the easy-enter position.

U.S. Pat. Nos. 2,826,241; 2,856,983; and 3,727,976 disclose vehicle seats that are supported generally in the manner described above.

SUMMARY OF THE INVENTION

An object of the present invention is to provide a vehicle seat support assembly for mounting a seat for movement between a rearward seating position and a forward easy-enter position where access to the area rearward of the seat from a door opening adjacent the outboard side thereof is increased over conventional support assemblies due to the construction of the assembly adjacent its rear outboard extremity.

Another object of the invention is to provide a vehicle seat support assembly that is normally maintained in a rearward seating position by a latch mechanism which is releasable by actuation of both outboard and rear handles to permit forward movement of the assembly to an easy-enter position, the outboard handle being released by a passenger entering the vehicle to permit access from a side door opening to the area rearward of the assembly, and the rear handle being released by a passenger rearward of the assembly to permit access to the door opening during exit from the vehicle.

In carrying out the above objects and other objects, the seat support assembly includes a lower frame for mounting on a vehicle floor laterally adjacent a side door opening of the vehicle, an upper frame for supporting a seat, and front and rear links associated with inboard and outboard sides of the assembly and having opposite ends respectively pivoted to the upper and lower frames to mount the upper frame for movement between a rearward seating position and a forward easy-enter position where the area rearward of the seat is accessible to the door area for entry into and exit from the vehicle. When the assembly is positioned in the forward easy-enter position, the opposite ends of the rear link at the outboard side of the assembly are positioned such that a straight line therebetween extends upwardly and forwardly from the lower frame to the upper frame through open space adjacent the rear outboard portion of the assembly and an intermediate portion of this link has a curved shape that is located downwardly and forwardly with respect to the straight line such that the space between the adjacent door and the area rearward of the seat affords a passenger convenient access during entrance to or exit from the vehicle. A latch mechanism of the assembly normally maintains the upper frame in the rearward seating position and is selectively releasable to permit forward movement of the upper frame to the easy-enter position so as to permit passenger entrance and exit from the vehicle area rearward of the assembly.

In the preferred construction of the support assembly, the rear outboard link has an intermediate portion with a continuously curved shape extending between the opposite link ends thereof and includes a pair of edge flanges for strengthening this link. The front link at the outboard side of the assembly and both the front and rear links at the inboard side thereof include straight intermediate portions extending between their link ends. Each frame includes both inboard and outboard frame members, and a pair of diagonal braces have lower ends pivoted to the lower frame member concentric with the adjacent link ends at one side of the assembly and have upper ends pivoted to the upper frame member concentric with the adjacent link ends at the other side of the assembly.

The latch mechanism of the assembly includes a first handle positioned at the outboard side of the assembly so as to permit release of the mechanism by a passenger entering the vehicle and also includes a separate second handle located adjacent the rear extremity of the assembly to permit release of the mechanism by a passenger from the rear of the assembly during exit from the vehicle. Latching of the latch mechanism preferably takes place between the outboard upper frame member and the rear outboard link so as to prevent pivotal movement therebetween and consequent forward movement of the upper frame. A keeper of the latch mechanism is mounted on the rear outboard link and a latch member thereof is mounted on the outboard upper frame member for movement between latching and nonlatching positions into and out of engagement with the keeper when the upper frame is in the rearward seating position. A latch spring of the mechanism biases the latch member to the latching position where there is engagement between the latch member and the outboard upper frame member such that the latch member is positioned for latching engagement with the keeper upon rearward movement to the seating position from the forward easy-enter position.

The first handle of the latch mechanism is preferably fixed on the latch member extending in an outboard direction therefrom to permit unlatching movement by a passenger entering the vehicle, and the second handle extends rearwardly from the latch member to permit a passenger rearward of the assembly to unlatch the mechanism. A preferred construction of the second handle is in the form of an elongated bar extending between the outboard and inboard upper frame members with the latch member fixed to the outboard end thereof and including a rearwardly extending intermediate bight portion that permits the passenger to the rear of the assembly to move the latch member to the nonlatching position against the bias of the latch spring.

As the upper frame of the support assembly is moved rearwardly to the seating position where latching of the latch mechanism takes place, stops on the rear inboard and outboard links respectively engage the inboard and outboard upper frame members to limit the rearward movement of the upper frame. The keeper on the rear outboard link preferably functions not only as a component of the latch mechanism but also as the stop of this link for engaging the upper outboard frame member to limit rearward movement thereof in cooperation with the stop on the rear inboard link.

The objects, features and advantages of the present invention are readily apparent from the following detailed description of the preferred embodiment taken in connection with the accompanying drawings.

DETAILED DESCRIPTION OF THE PREFERRED EMBODIMENT

Figure 1:
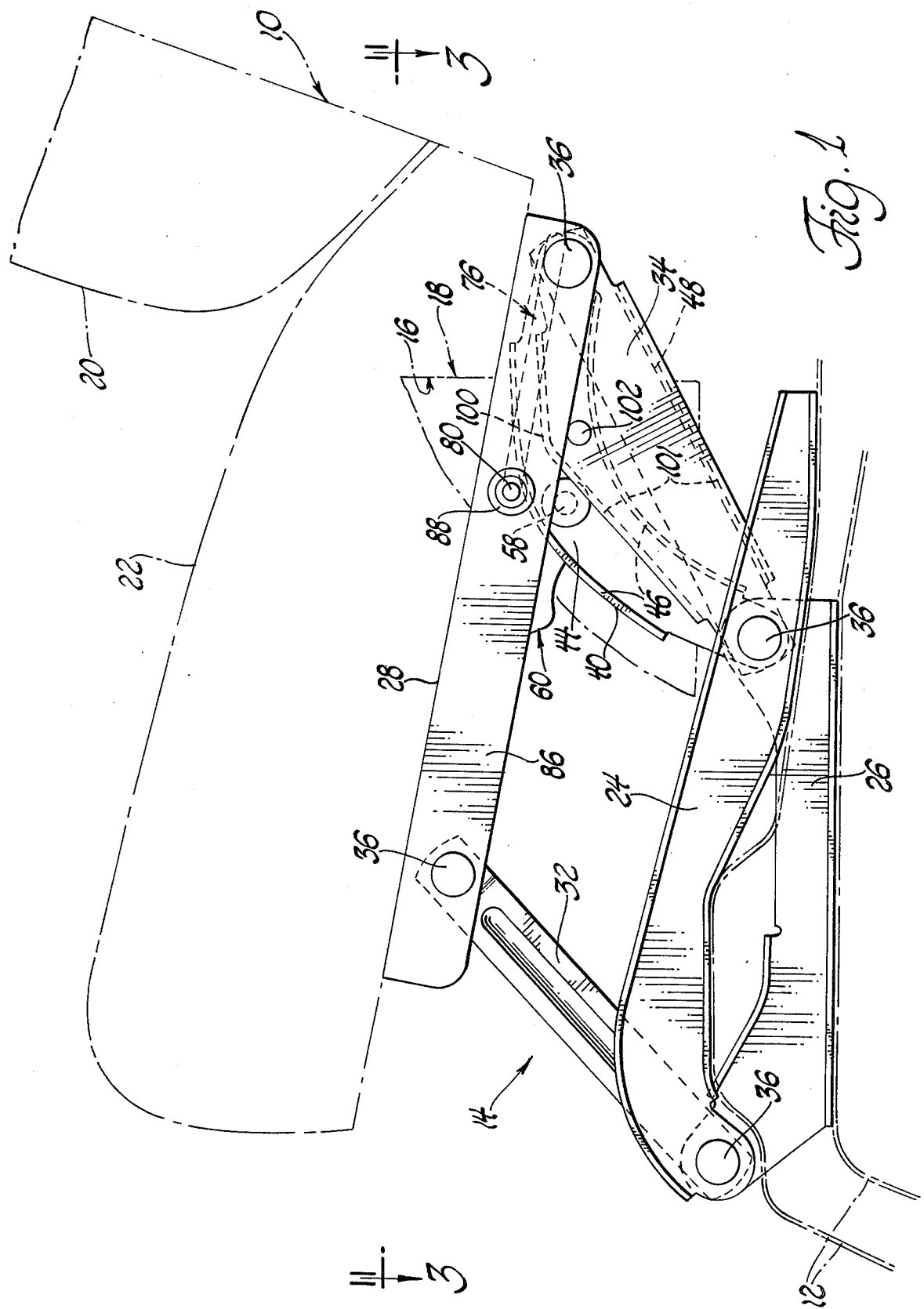
FIG. 1 is a side elevation view looking in an outboard direction at a vehicle seat support assembly which embodies the invention and is positioned in a rearward seating position.

With reference to FIG. 1, a vehicle bucket-type seat shown by phantom lines and indicated by reference numeral 10 is mounted on a phantom line vehicle floor 12 by a support assembly 14 that embodies the present invention. Movement of the support assembly 14 from the rearward seating position shown in FIG. 1 to the forwardly shifted easy-enter position of FIG. 2 affords a vehicle passenger access to the area rearward of seat 10 for entry to the vehicle or exit therefrom through a side door opening 16 that is normally closed by a side door 18. Seat 10 includes a vertical seat back 20 that is inclined slightly rearwardly and a seat cushion 22 that fixedly supports the seat back by suitable framework that is not shown.

Figure 5:
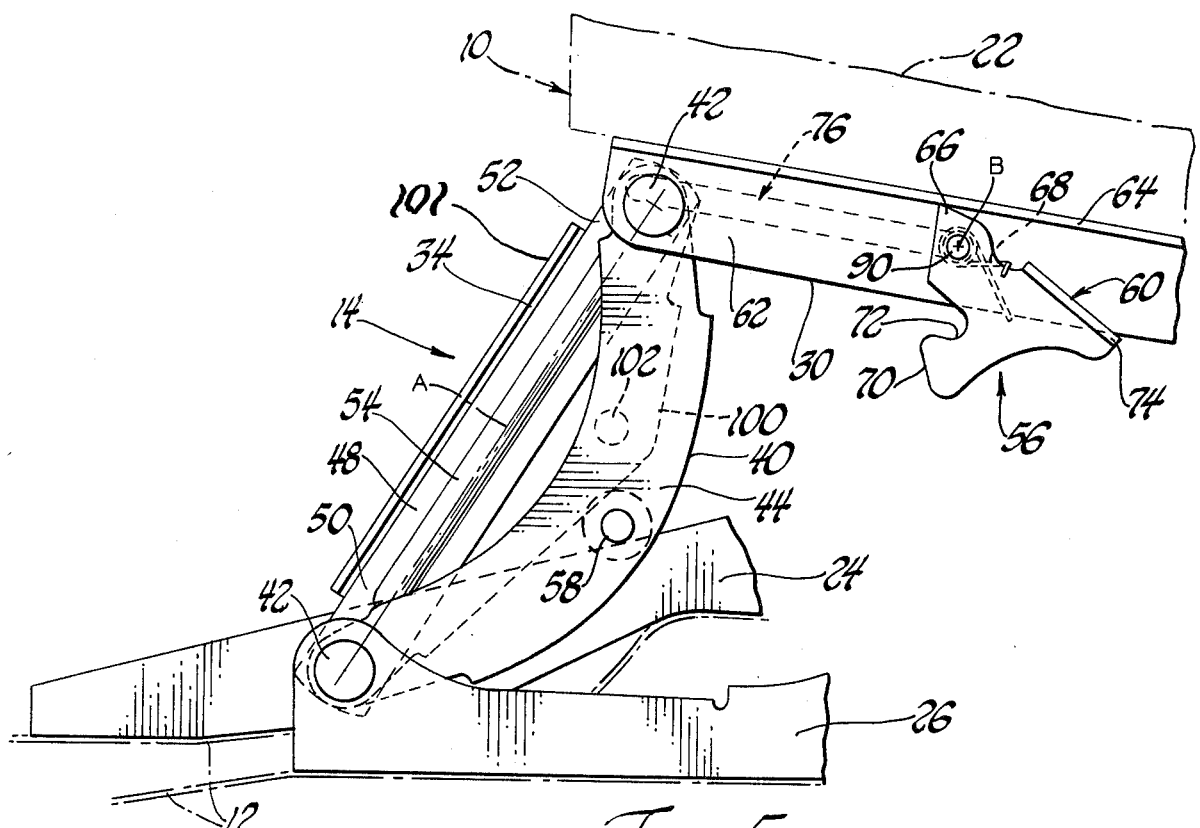
FIG. 5 is a partial view taken in the same direction as FIG. 4 but with the assembly moved to its forwardly shifted easy-enter position.
Figure 6:
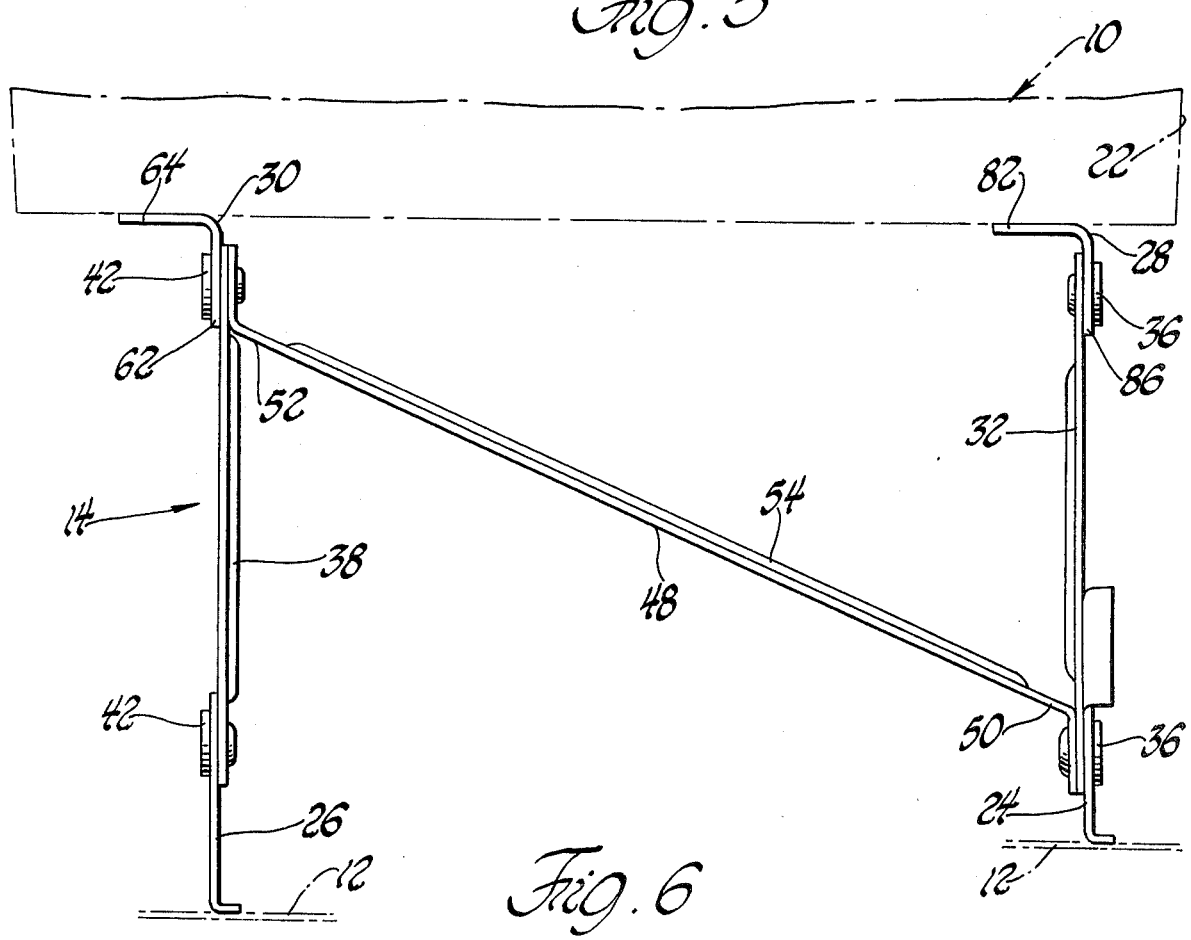
FIG. 6 is a view of the assembly taken along the 6—6 of FIG. 3 looking in a rearward direction.

With reference to FIGS. 1 and 6, support assembly 14 has a lower frame including inboard and outboard frame members 24 and 26, respectively, mounted on the vehicle floor 12 and secured thereto in a suitable manner extending longitudinally with respect to the vehicle. An upper frame of the support assembly includes inboard and outboard frame members 28 and 30 supporting the inboard and outboard sides of the seat cushion 22 and also extending in a generally longitudinal direction with respect to the vehicle. Front and rear inboard links 32 and 34 shown in FIG. 1 have generally straight intermediate portions extending between their opposite upper and lower ends which are pivoted to the inboard lower and upper frame members 24 and 28 by headed pins 36. Likewise, front and rear outboard links 38 and 40 shown in FIG. 4 have opposite upper and lower ends pivoted to the lower and upper outboard frame members 26 and 30 by headed pins 42. The front outboard link 38 has a straight intermediate portion between its opposite upper and lower ends while the rear outboard link 40 has a curved intermediate portion 44 that increases the access space to and from the area rearward of the seat with the support assembly positioned in its forward easy-enter position. Links 32, 34, 38 and 40 cooperate with the upper and lower frames in a parallelogram linkage fashion to mount the seat for movement between the rearward seating position of FIGS. 1 and 4 and the forward easy-enter position of FIGS. 2 and 5.

As seen in the forwardly shifted position of FIG. 5, a straight line A between the centers of the pins 42 at the opposite ends of rear outboard link 40 extends upwardly and forwardly through open space from the rear end of the lower outboard frame member 26 to the rear end of the upper outboard frame member 30. The curved intermediate portion 44 of link 40 is located downwardly and forwardly from this straight line to permit the link to function in supporting upper outboard frame member 30 for its forward and rearward movement on the lower outboard frame member 26 while still permitting an occupant to have access through the space which would otherwise be occupied were this link of a straight configuration. Due to the curved construction of the rear outboard link 40 and the orientation it assumes in the forward easy-enter position, a vehicle passenger entering or leaving the vehicle through the side door opening has increased access space while moving to or from the area rearward of the seat.

Figure 2:
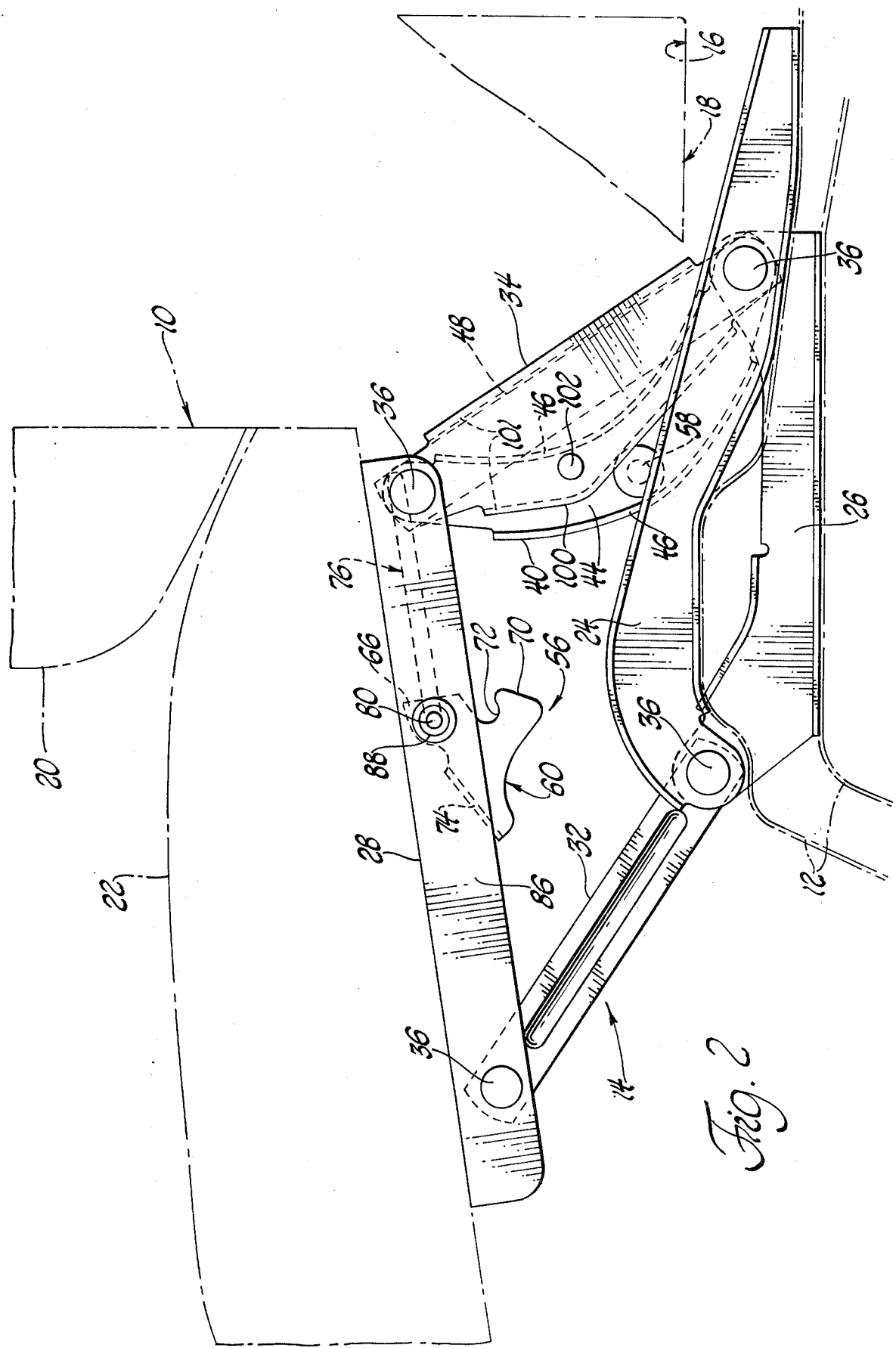
FIG. 2 is a view of the support assembly taken in a similar direction to FIG. 1 but shown in a forwardly shifted easy-enter position.
Figure 4:
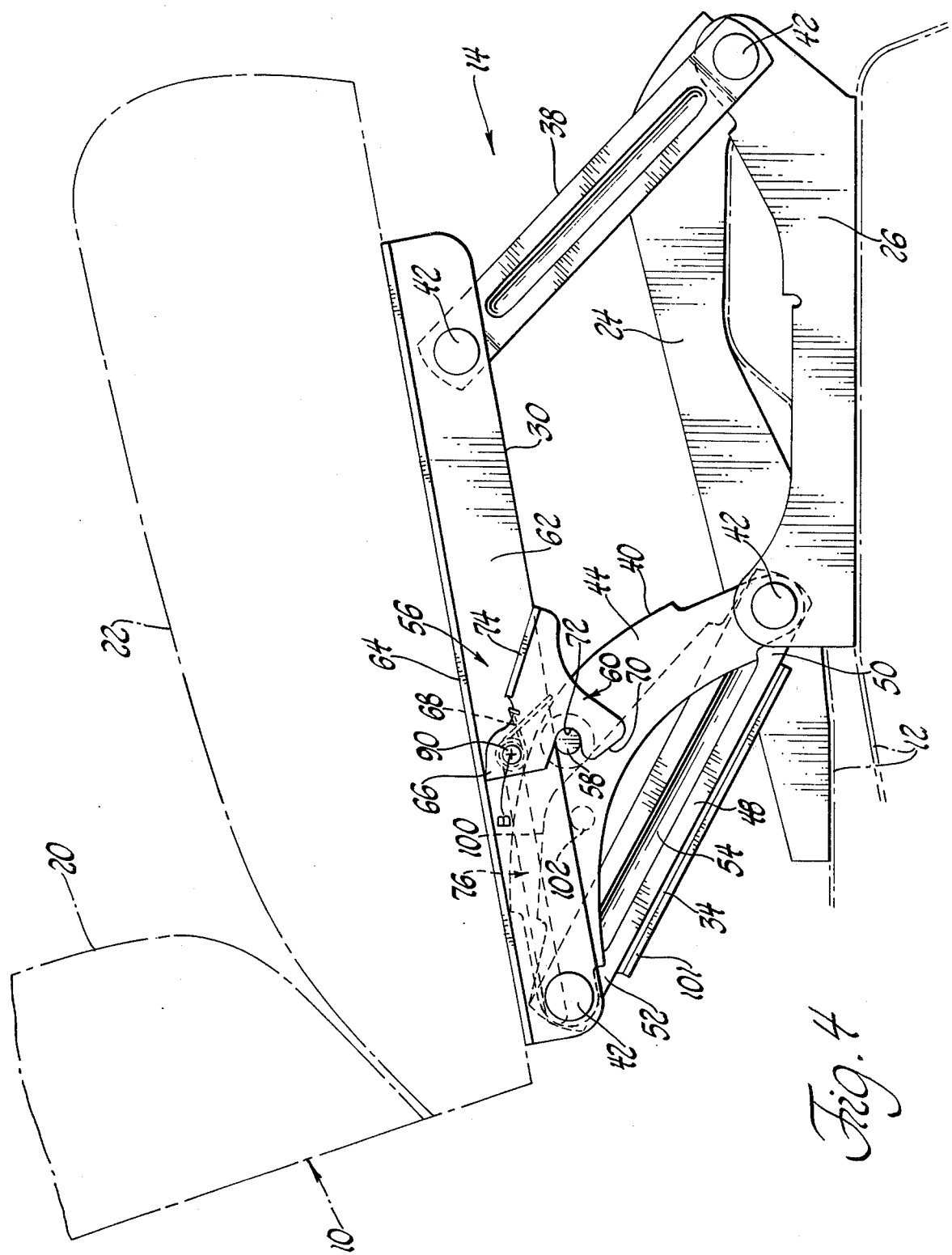
FIG. 4 is a side elevation view of the support assembly looking in an inboard direction along line 4—4 of FIG. 3 with the assembly positioned in its rearward seating position.

With reference to FIG. 4, the rear outboard link 40 preferably has its intermediate portion 44 provided with a continuosly curved shape. This continuously curved shape of the link portion 44, as seen by reference to FIG. 1 and 2, is defined by a pair of edge flanges 46 that extend in an inboard direction from the rest of the link and provide a strengthening function. Although the intermediate link portion 44 preferably has this continuously curved shape defined by the edge strengthening flanges 46, it may also have a more abrupt curvature such as an L-configuration while still providing the increased access advantage to the area rearward of the seat supported by the assembly.

Figure 3:
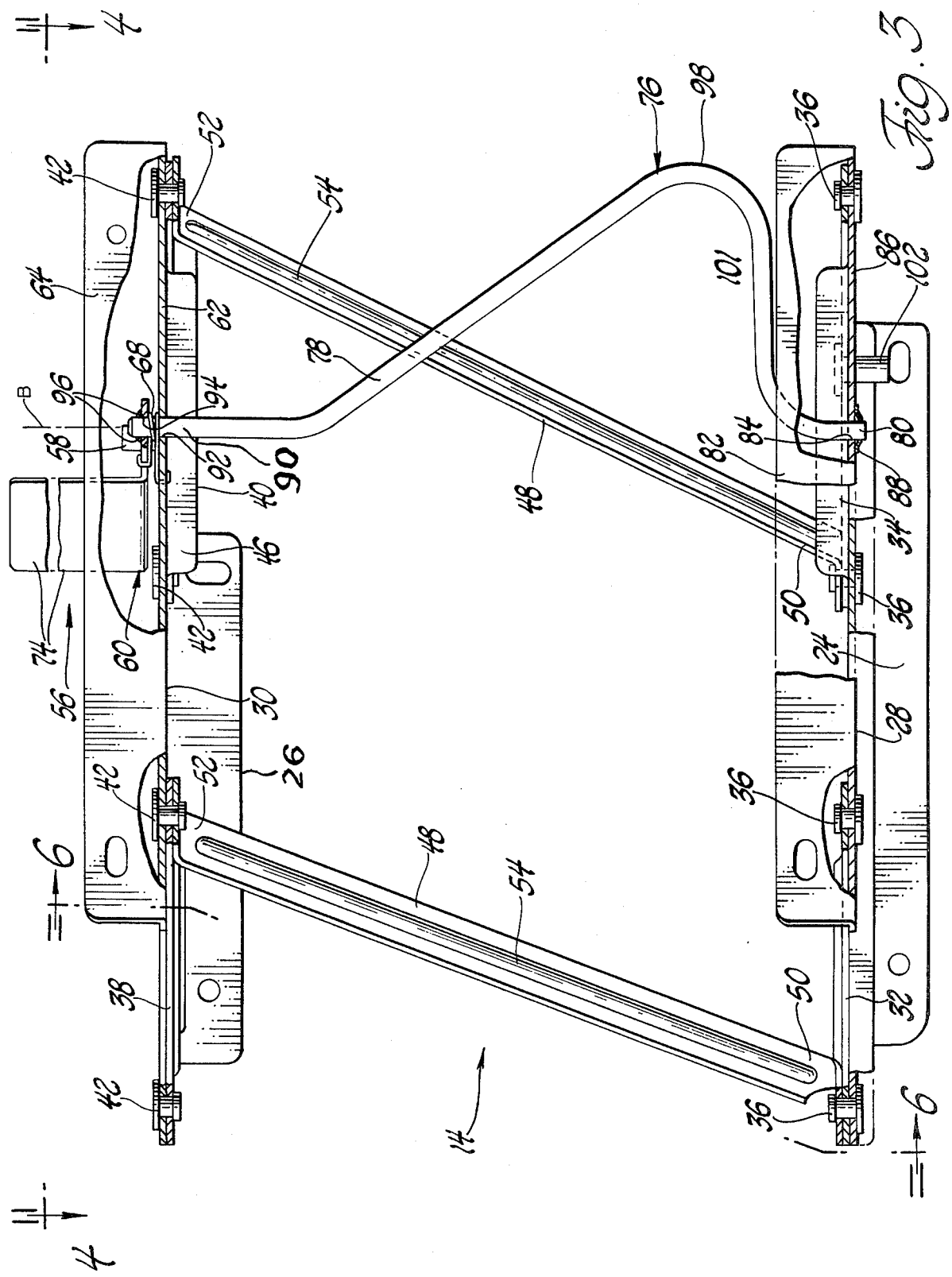
FIG. 3 is a top plan view of the assembly taken along line 3—3 of FIG. 1.

As seen by combined reference to FIGS. 3 and 6, support assembly 14 includes a pair of front and rear braces 48 having lower ends 50 pivoted to the lower inboard frame member 24 by the pins 36 so as to pivot concentric with the lower ends of the front and rear inboard links 32 and 34. Braces 48 extend diagonally with respect to the assembly from their lower ends 50 to upper ends 52 thereof which are pivoted to the upper outboard frame member 30 by the pins 42 concentric with the upper ends of the outboard links 38 and 40. The manner in which the diagonal braces 48 extend between the lower frame member at one side of the assembly and the upper frame member at the other side of the assembly while being pivoted for movement with the support links 32, 34, 38 and 40 provides a structurally reinforced assembly in both the rearward seating position and the forward easy-enter position. The strength of these braces 48 is increased by stamped ribs 54 extending between their lower and upper ends 50 and 52.

With reference to FIG. 4, a latch mechanism generally indicated by 56 normally maintains the support assembly 14 in the rearward seating position and selectively allows movement thereof to the forward easy-enter position when a passenger desires to enter or leave the vehicle area rearward of the seat through the door opening laterally outboard from the assembly. Actuation of latch mechanism 56 to permit the forward seat movement can be conveniently accomplished from both outboard and rear positions with respect to the seat due to the latch mechanism components which are disclosed. Preferably, the latch mechanism extends between the upper outboard frame member 30 and the curved outboard rear link 40 in the latched condition shown in FIG. 4. The latch mechanism includes a keeper 58 fixedly mounted on the intermediate portion 44 of link 40 extending in an outboard direction with a round cross section. A latch member 60 of the mechanism is pivotally mounted about an axis B on a vertical flange 62 of frame member 30 for movement between latching and nonlatching positions with respect to keeper 58. A horizontal flange 64 of frame member 30 has a lower side which engages an upper projection 66 of the latch member to limit its clockwise movement as viewed in FIG. 5 under the bias of a latch spring 68 when the seat assembly is moved forwardly from its rearward seating position. A cam surface 70 of latch member 60 is positioned by the engagement of projection 66 with flange 64 to cam against the keeper 58 upon seat movement to the rearward seating position such that the latch member 60 pivots counterclockwise momentarily against the bias of the latch spring 68 to the nonlatching position and then clockwise back to the latching position so as to receive the keeper within a keeper opening 72. The location of axis B with respect to the rearwardly opening configuration of keeper opening 72 prevents rotation of the latch member from the latching position to the nonlatching position upon being subjected to forces tending to move the seat 10 forward. Consequently, the upper end of the outboard rear link 40 is prevented from rotating with respect to the rear end of upper outboard frame member 30 so as to prevent forward seat movement.

A first handle 74 of latch mechanism 56 is seen in FIGS. 3 and 4 as being embodied by an integral latch member handle portion which extends in an outboard direction past the outboard extremity of the horizontal frame member flange 64. A passenger desiring to enter the vehicle after opening the door laterally outboard from assembly 14 manually raises the handle portion 74 to rotate the latch member 60 in a counterclockwise direction was viewed in FIG. 4. This counterclockwise rotation of the latch member 60 moves it to a nonlatching position where the keeper 58 is released from the keeper opening 72 of the latch member so as to permit the support assembly to be moved forwardly to position the seat 10 in the easy-enter position. Subsequent rearward movement of the support assembly returns the seat to its easy-enter position while the latch member is automatically latched as the cam surface 70 initially engages the keeper 58 to rotate the latch member counterclockwise in a manner that causes the keeper 58 to move into the keeper opening 72.

As seen in FIG. 3, a second handle 76 of the latch mechanism 56 is embodied as an elongated bar 78 that extends between the inboard and outboard sides of the support assembly. An inboard end portion 80 of bar 78 extends under a horizontal flange 82 of the upper inboard frame member 28 through an aperture 84 in a vertical flange 86 of this frame member so as to be pivotally supported thereby while retained in position against outward movement by a clip 88. An outboard end portion 90 of bar 78 extends outwardly through an aperture 92 in the vertical flange 62 of upper outboard frame member 30 so as to be pivotally supported by this frame member. Outboard bar end portion 90 also extends outwardly through an aperture 94 in the latch member 60 and is secured to the outboard side of the latch member by welds 96 to pivotally support the latch member for rotation about the axis B. Between the latch member 60 and the vertical frame member flange 62, outboard end portion 90 is encircled by an intermediate portion of the latch spring 68 which also includes a pair of end portions respectively hooked over the latch member and this flange to provide the spring bias of the latch member. An intermediate bight portion 98 of bar 78 extends rearwardly to provide a handle portion that enables a vehicle passenger rearward of seat 10 to unlatch the latch mechanism 56 prior to exit from the vehicle. This unlatching is accomplished by a manually actuated downward movement of the bight portion 98 to pivot the latch member 60 counterclockwise as viewed in FIG. 4 to its nonlatching position where the keeper 58 is released from the keeper opening 72 to permit movement of the assembly its forward easy-enter position. Additionally, it should be noted that the bight portion 78 has an unsymmetrical configuration with respect to the lateral extent of the assembly and extends rearwardly near its inboard side than its outboard side to prevent interference with the upper end 52 of the rear diagonal brace 48 adjacent the outboard upper frame member 30.

As seen in FIG. 1, the rear inboard link 34 has an upwardly and forwardly extending projection 100 that supports a stop 102. Strengthening edge flanges 101 of link 34 are located at each of its sides extending in an outboard direction, see also FIG. 3. Stop 102 extends in an inboard direction from link 34 and is located below the vertical flange 86 of the upper inboard frame member 28 such that rearward movement of the assembly to its FIG. 1 position causes engagement of this stop with the lower side of this flange to positively locate the assembly in the position shown. Keeper 58 of the latch mechanism 56 extends in an outboard direction from the intermediate portion 44 of rear outboard link 40 below the vertical flange 62 of the upper outboard frame member 30. Keeper 58 also functions as a stop that engages the lower side of frame member flange 62 to prevent rearward movement of the frame member 30 and to cooperate with the stop 102 of the rear inboard link 34 in maintaining the seat 10 against movement to the rear past the seating position shown in FIGS. 1 and 4. It should be noted that each of the upper frame members 28 and 30 at both the inboard and outboard sides of the assembly have identical constructions with their horizontal flanges extending in an outboard direction from their vertical flanges such that there is no necessity to provide separate tooling for these two components. However, due to the configuration of the floor 12 on which the lower frame members 24 and 26 are mounted, these frame members have different configurations that must be stamped from different tooling.

While a preferred embodiment of the vehicle seat support assembly has herein been described, those skilled in the art will recognize various alternative designs and embodiments for practicing the present invention as defined by the following claims.

What is claimed is:

1. A vehicle seat support assembly for mounting a seat on a vehicle floor laterally adjacent a side door of the vehicle, the support assembly comprising: a lower frame for mounting on the vehicle floor; an upper frame for supporting the seat; front and rear links associated with inboard and outboard sides of the assembly and having opposite ends respectively pivoted to the upper and lower frames such that the upper frame is movable between a rearward seating position and a forward easy-enter position where the area rearward of the seat supported by the assembly is accessible to adjacent the door for entry into and exit from the vehicle; the frames each having an outboard rear extremity; the opposite ends of the rear link at the outboard side of the assembly being pivotally connected to the outboard rear extremities of the upper and lower frames such that a straight line therebetween with the upper frame in the easy-enter position extends upwardly and forwardly from the lower frame to the upper frame through open space adjacent the rear outboard portion of the assembly; the outboard rear link having an intermediate portion connecting the opposite ends thereof with a curved shape that is located downwardly and forwardly with respect to the straight line between the opposite ends thereof when the upper frame is positioned in the forward easy-enter position whereby the location of pivotal link connection to the outboard rear frame extremities increases the space between the door area and the rearward of the seat supported by the assembly and thus affords a passenger convenient access during entrance into or exit from the vehicle; and a latch mechanism for maintaining the upper frame in the rearward seating position and for selectively releasing the upper frame for movement to the forward easy-enter position.

2. A support assembly as in claim 1 wherein the rear outboard link has an intermediate portion with a continuously curved shape extending between its ends.

3. A support assembly as in claim 2 wherein the intermediate portion of the rear outboard link includes a pair of edge flanges with the continuously curved shape.

4. A support assembly as in claim 1 wherein the front link at the outboard side of the assembly and both the front and rear links at the inboard side of the assembly include straight intermediate portions extending between their opposite ends.

5. A support assembly as in claim 1 wherein the upper and lower frames each include inboard and outboard frame members; and a pair of diagonal braces having lower ends pivoted to the lower frame member concentric with the links at one side of the assembly and also having upper ends pivoted to the upper frame member concentric with the links at the other side of the assembly.

6. A support assembly as in claim 5 wherein the latch mechanism extends between the outboard upper frame member and the curved rear outboard link to maintain the upper frame in the rearward seating position.

7. A support assembly as in claim 6 wherein the latch mechanism includes a keeper mounted on the rear outboard link and a latch member mounted on the outboard upper frame member for movement between latching and nonlatching positions into and out of engagement with the keeper when the upper frame is in the rearward seating position.

8. A support assembly as in claim 7 that includes a latch spring for biasing the latch member to the latching position, a first handle on the latch member for enabling a passenger entering the vehicle to move the latch member against the bias of the spring to the nonlatching position, and a second handle extending rearwardly from the latch member to enable a passenger rearward of the seat supported by the assembly to move the latch member to the nonlatching position against the bias of the spring.

9. A support assembly as in claim 8 wherein the upper outboard frame member includes a flange that engages the latch member to limit the movement thereof under the bias of the spring when the upper frame is moved forwardly to the easy-enter position such that the latch member is thereby positioned for latching engagement with the keeper upon subsequent rearward movement of the upper frame to the seating position.

10. A support assembly as in claim 8 wherein the rear inboard and outboard links include stops that respectively engage the upper inboard and outboard frame members to limit the rearward movement of the upper frame.

11. A support assembly as in claim 10 wherein the keeper of the latch mechanism also functions as the stop of the rear outboard link.

12. A support assembly as in claim 8 wherein the second handle comprises an elongated bar having an outboard end portion pivotally supported by the upper outboard frame member and an inboard end portion pivotally supported by the upper inboard frame member, the latch member being supported on the outboard end portion of the bar, and the bar including an intermediate bight portion that extends rearwardly to permit a passenger to move the latch member to the nonlatching position from the rear of the support assembly.

13. A support assembly as in claim 12 wherein the bight portion of the elongated bar extends rearwardly at a location farther from the upper frame member to which the upper ends of the diagonal braces are pivoted than from the other upper frame member such that the braces do not interfere with movement of the bight portion during releasing of the latch mechanism.

14. A vehicle seat support assembly for mounting a seat on a vehicle floor laterally adjacent a side door of the vehicle, the support assembly comprising: a lower frame for mounting on the vehicle floor; an upper frame having laterally spaced frame members for supporting the seat; front and rear links associated with inboard and outboard sides of the assembly and having opposite ends respectively pivoted to the upper and lower frames such that the upper frame is movable between a rearward seating position and a forward easy-enter position where the area rearward of the seat supported by the assembly is accessible to adjacent the door area for entry into and exit from the vehicle; a latch mechanism for maintaining the upper frame in the rearward seating position and for selectively releasing the upper frame for movement to the forward easy-enter position; said latch mechanism having a first handle positioned at the outboard side of the assembly so as to permit release of the mechanism by a passenger entering the vehicle; the latch mechanism including a separate second handle that extends laterally between the frame members of the upper frame for pivotally supported movement about a horizontal axis to release the latch mechanism; and the second latch handle having a bight portion that extends rearwardly to adjacent the rear extremity of the assembly so as to permit release of the mechanism by a vehicle passenger from the rear of the assembly during exit from the vehicle.

15. A support assembly as in claim 14 wherein the upper and lower frames each include inboard and outboard frame members, the latch mechanism including a keeper mounted on the rear outboard link and a latch member mounted on the upper outboard frame member for movement between latching and nonlatching positions with respect to the keeper, the latch member including an integral portion providing the first handle, the second handle including a bar having an outboard end portion pivotally supported on the upper outboard frame member and an inboard end portion pivotally supported on the upper inboard frame member, and the latch member being fixed on the outboard end portion of the bar to permit a vehicle passenger rearward of the support assembly to grasp the bight portion and move the latch member to its non-latching position so as to release the upper frame for forward movement to the easy-enter position.

16. A support assembly as in claim 15 wherein the latch mechanism includes a spring that biases the latch member to the latching position into engagement with the upper outboard frame member such that the latch member is positioned to engage the keeper upon rearward movement to the seating position from the forward easy-enter position.

17. A support assembly as in claim 16 wherein the rear outboard and inboard links include stops that respectively engage the upper outboard and inboard frame members to limit rearward seat movement.

18. A support assembly as in claim 17 wherein the keeper of the latch mechanism also functions as the stop of the rear outboard link.

19. A vehicle seat support assembly for mounting a seat on a vehicle floor laterally adjacent a side door of the vehicle, the support assembly comprising: a lower frame for mounting on the vehicle floor; an upper frame for supporting the seat; front and rear links associated with inboard and outboard sides of the assembly and having opposite ends respectively pivoted to the upper and lower frames such that the upper frame is movable between a rearward seating position and a forward easy-enter position where the area rearward of the seat supported by the assembly is accessible to adjacent the door for entry into and exit from the vehicle; the frames each having an outboard rear extremity; the opposite ends of the rear link at the outboard side of the assembly being pivotally connected to the outboard rear extremities of the upper and lower frames such that a straight line therebetween with the upper frame in the easy-enter position extends upwardly and forwardly from the lower frame to the upper frame through open space adjacent the rear outboard portion of the assembly; the outboard rear link having an intermediate portion connecting the opposite ends thereof with a curved shape that is located downwardly and forwardly with respect to the straight line between the opposite ends thereof when the upper frame is positioned in the easy-enter position whereby the location of pivotal link connection to to the outboard frame extremities increases the space between the door area and the area rearward of the seat supported by the assembly and thus affords a passenger convenient access during entrance into and exit from the vehicle; a latch mechanism for maintaining the upper frame in the rearward seating position and for selectively releasing the upper frame for movement to the forward easy-enter position; said latch mechanism having a first handle positioned at the outboard side of the assembly so as to permit release of the mechanism by a passenger entering the vehicle; the latch mechanism including a separate second handle supported on the upper frame for pivotal movement about a horizontal axis to release the latch mechanism; and the second handle having a bight portion that extends rearwardly so as to be located adjacent the rear extremity of the assembly to permit release of the mechanism by a vehicle passenger from the rear of the seat during exit from the vehicle.

* * * * *

UNITED STATES PATENT OFFICE
CERTIFICATE OF CORRECTION

Patent No. 4,046,349     Dated September 6, 1977

Inventor(s) James E. MacAfee

It is certified that error appears in the above-identified patent and that said Letters Patent are hereby corrected as shown below:

Column 1, line 19 after "positioned," insert --a--.
Column 1, line 28 "sheet" should be --seat--.
Column 5, line 54 "was" should be --as--.
Column 6, line 29 after "assembly" insert --to--.
Column 7, line 32 before "rearward" insert --area--.
Column 10, line 21 delete "to" second instance.

Signed and Sealed this

Thirteenth Day of December 1977

[SEAL]

Attest:

RUTH C. MASON
Attesting Officer

LUTRELLE F. PARKER
Acting Commissioner of Patents and Trademarks